I. A. WESSON.
COMBINED FERTILIZER DISTRIBUTER AND SEED DROPPER.
APPLICATION FILED JAN. 5, 1911.
991,574.
Patented May 9, 1911.
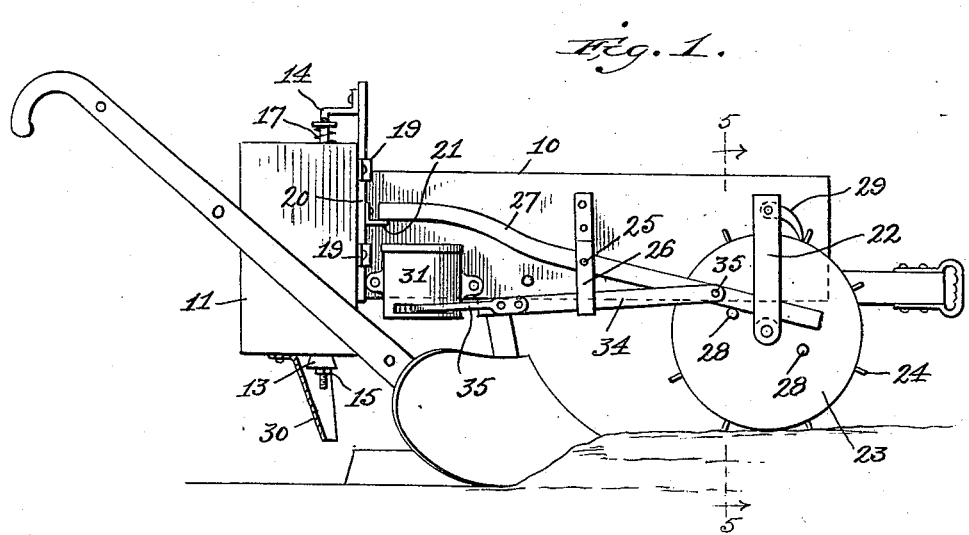
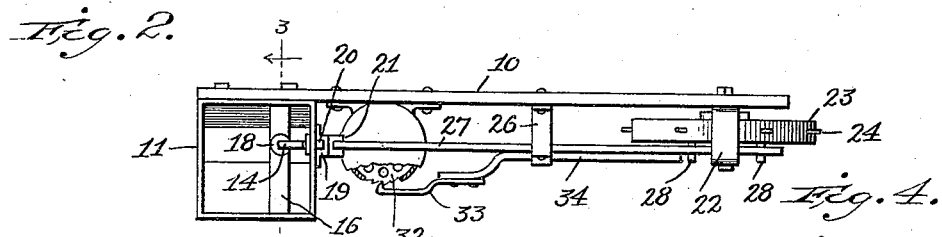
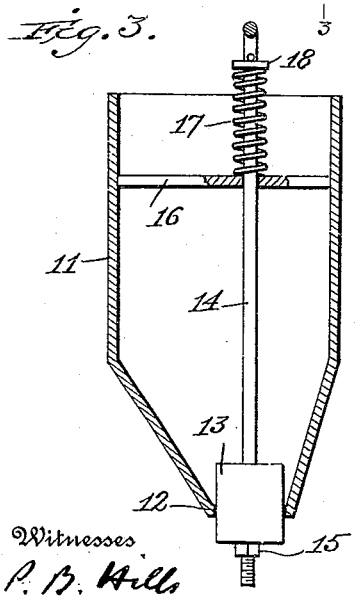
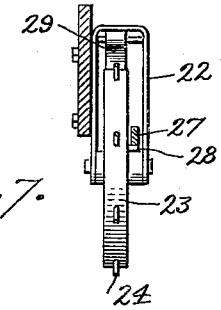
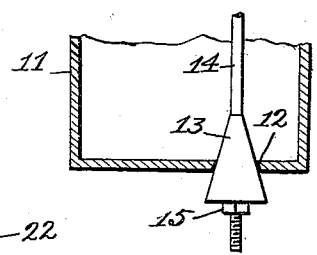
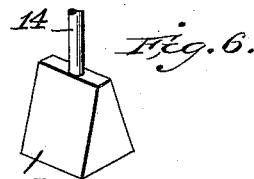
Inventor
Isaac A. Wesson
Witnesses
P. B. Hills
Edwin Frey
By Edwin L. Jewell
his Attorney

UNITED STATES PATENT OFFICE.

ISAAC A. WESSON, OF WINGO, KENTUCKY.

COMBINED FERTILIZER-DISTRIBUTER AND SEED-DROPPER.

991,574.  Specification of Letters Patent.  Patented May 9, 1911.

Application filed January 5, 1911. Serial No. 601,013.

*To all whom it may concern:*

Be it known that I, ISAAC A. WESSON, a citizen of the United States, residing at Wingo, in the county of Graves and State of Kentucky, have invented certain new and useful Improvements in Combined Fertilizer-Distributers and Seed-Droppers, of which the following is a specification.

This invention relates to improvements in combined fertilizer distributers and seed droppers, and has for its particular object to provide such a device, having its parts so assembled, that it is adapted to be secured to a plow beam as a unit. This and other objects are attained by the means illustrated in the accompanying drawing, in which:—

Figure 1, is a side elevation of my invention applied to a plow beam; Fig. 2, is a plan view of the device; Fig. 3, is a vertical sectional view taken on the line 3—3 of Fig. 2; Fig. 4, is a similar view of the lower end of the fertilizer box taken at right angles to Fig. 3; Fig. 5, is a sectional view taken on the line 5—5 of Fig. 1; Fig. 6, is a detail perspective view of my improved valve; and Fig. 7, is a view showing a modification of said valve.

Similar reference numerals in all of the figures designate like parts.

Referring to the drawing, 10 designates a support removably mounted on a plow beam to the rear end of which is secured a receptacle 11, and said receptacle is preferably constructed with inclined sides to form a fertilizer hopper, the bottom of which contains a valve opening 12. Adapted to operate in said valve opening 12 and to regulate the feed of the contents of said receptacle through said opening, is a valve 13, preferably wedge-shaped as shown in Fig. 6, the base of said valve being below the bottom of the receptacle, whereby in operation to open said valve it is necessary to force the same downward. The valve is mounted upon the stem 14 and is adapted for vertical adjustment, said adjustment being accomplished with the nut 15 which is screw-threaded on the lower end of the stem. The stem 14 extends upwardly from the valve above the top of the receptacle, and is supported and guided by a cross-piece 16 secured within the hopper. The valve is normally held in the valve-opening by a spring 17, which is confined between the cross-piece 16 and a collar 18 upon the valve stem.

Upon the front side of the receptacle is slidably mounted in guides 19, a bar 20, to the upper end of which is secured the valve-stem 14, and intermediate its length is fixed a projection 21 for the purpose hereinafter described.

To the front end of the support 10 is fixed a yoke 22, in the lower ends of which is journaled the power-wheel 23, said wheel being provided with peripheral spikes or teeth 24 to facilitate its engagement with the ground. Intermediate said wheel 23 and receptacle 11, is pivoted at 25, in a bracket 26, a lever 27, one end of which normally rests upon the projection 21, and its other end extends forwardly between the yoke 22 and the wheel 23, and is adapted to be engaged by the pins 28 in said wheel.

From the foregoing description it is obvious that when the power-wheel is rotated, the pins 28 will successively engage the front end of the lever 27 and raise the same, which operation will depress the rear end of said lever, and owing to its engagement with the sliding bar 20, the same will be forced downwardly, which will, at the same time, open the valve.

To the top of the yoke 22 is pivoted a pawl 29, which is adapted to prevent the backward turning of the power-wheel, by engaging the spikes 24, but allowing of a free rotation of said wheel when going forward.

The device, as above described, is especially adapted for distributing fertilizer, and can be used for dropping or sowing small seed combined with fertilizer, but in the latter case it is preferable to utilize a spout 30, to direct the seed into the furrows.

Where it is desired to plant larger seed, such as corn, cotton seed, etc., with the fertilizer, an additional receptacle 31 is secured to the support 10, and as shown in the present case, said receptacle is provided with a toothed dropping wheel 32 of the usual construction, and said wheel is operated by a toothed finger 33, which is secured to an arm 34, slidably supported in the bracket 26, and having one end pivotally secured at 35 to the lever 27. Thus, when the lever 27 is operated to open the valve in the receptacle 11, as before mentioned, the toothed finger 33 is drawn forward, thereby operating the dropping wheel, thereby dropping seed simultaneously with the fertilizer.

In Fig. 7 a modification of the valve is shown, the same being conical in form.

In operation the device is secured to the beam of a plow, as shown clearly in Fig. 1, in which instance a single furrow plow is used and the support is bolted thereto, and it will be understood that where a double plow is used, a duplication of certain parts would be necessary, that is, either two separate fertilizer boxes with a valve in each operated by the same wheel, or a single receptacle with two valves, with spouts to position the material.

The particularly constructed valve is especially advantageous when distributing fertilizer, as the inclined sides spread the fertilizer in different directions, and the adjustment of said valve regulates the amount to be fed through the valve opening.

Having thus fully described my invention, what I claim and desire to secure by Letters Patent, is:—

1. A device of the character described, adapted to be removably secured to the beam of a plow, comprising a vertically arranged support, a receptacle secured to one end thereof, a valve for said receptacle, a power wheel journaled on the opposite end of said support, a lever extending lengthwise of said support and operated by said power wheel for opening said valve, and means for closing said valve.

2. A device of the character described adapted to be removably secured to the beam of a plow, comprising a vertically arranged support, a receptacle secured to one end thereof, a valve for said receptacle, a power wheel journaled on the opposite end of said support, a lever extending lengthwise of said support and operated by said power wheel for opening said valve, means for closing said valve, and means for preventing said power wheel from turning backward.

In testimony whereof I affix my signature in presence of two witnesses.

ISAAC A. WESSON.

Witnesses:
 JESSE R. SHELTON,
 WM. BYRN.

---

Copies of this patent may be obtained for five cents each, by addressing the "Commissioner of Patents, Washington, D. C."